United States Patent [19]
Krock et al.

[11] 3,957,822
[45] May 18, 1976

[54] ANTHRAQUINONE DYESTUFFS

[75] Inventors: Friedrich Wilhelm Krock, Opladen;
Rutger Neeff, Leverkusen, both of Germany

[73] Assignee: Bayer Aktiengesellschaft, Leverkusen, Germany

[22] Filed: June 19, 1974

[21] Appl. No.: 480,853

[30] Foreign Application Priority Data
June 19, 1973 Germany............................ 2331056

[52] U.S. Cl. ................................ 260/340.3; 8/39 B
[51] Int. Cl.² ................ C07D 319/20; C07D 319/22
[58] Field of Search ........................ 260/340.3, 380

[56] References Cited
UNITED STATES PATENTS

| | | | |
|---|---|---|---|
| 3,445,485 | 5/1969 | Straley | 260/380 |
| 3,493,587 | 2/1970 | Yelland | 260/340.3 X |
| 3,636,006 | 1/1972 | Vuilleme et al. | 260/340.3 X |
| 3,763,192 | 10/1973 | Cabut | 260/380 X |
| 3,823,168 | 7/1974 | Hohmann et al. | 260/340.3 X |

*Primary Examiner*—Richard L. Raymond
*Attorney, Agent, or Firm*—Plumley & Tyner

[57] ABSTRACT

Anthraquinone dyestuffs of the formula

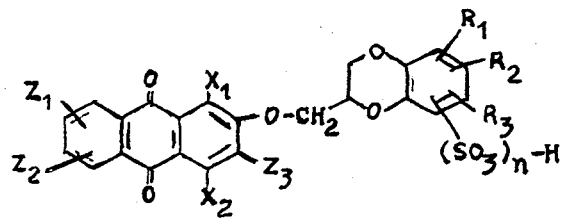

wherein
$X_1$ and $X_2$ represent hydroxyl or amino,
$R_1$, $R_2$ and $R_3$ represent hydrogen or a non-ionic substituent, and two adjacent radicals can also represent a fused saturated or unsaturated ring,
$Z_1$, $Z_2$ and $Z_3$ represent halogen or especially hydrogen and
$n$ represents 0 or especially represents 1
are suitable for dyeing natural and synthetic fibre materials, especially those of polyamides.

7 Claims, No Drawings

ANTHRAQUINONE DYESTUFFS

The invention relates to anthraquinone dyestuffs which in the form of the free acid correspond to the formula

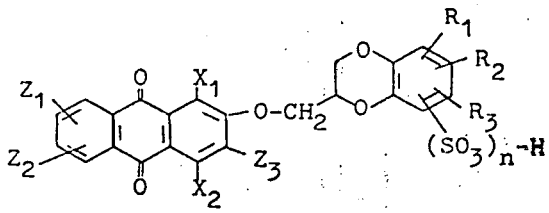

and to their preparation and use for dyeing natural and synthetic fibre materials, especially those of polyamides.

In the formula I
$X_1$ and $X_2$ represent hydroxyl or amino,
$R_1$, $R_2$ and $R_3$ represent hydrogen or a non-ionic substituent, and two adjacent radicals can also represent a fused saturated or unsaturated ring,
$Z_1$, $Z_2$ and $Z_3$ represent halogen or especially hydrogen and
$n$ represents 0 or especially represents 1.

Suitable non-ionic substituents $R_1$, $R_2$ and $R_3$ are, for example, $C_1$–$C_8$-alkyl, $C_1$–$C_4$-alkoxy, $C_1$–$C_4$-alkylmercapto and $C_1$–$C_4$-alkylsulphonyl groups, formyl, $C_1$–$C_4$-alkylcarbonyl, benzoyl, nitrile, halogen atoms, such as fluorine, chlorine or bromine, or the benzyl, benzyloxy and benzylsulphonyl group.

Suitable $C_1$–$C_8$-alkyl groups are, for example, methyl, ethyl, propyl, isopropyl, butyl, isobutyl, tert.-butyl, pentyl, isopentyl, hexyl, 1,1-dimethylbutyl, 1,1,3-trimethylbutyl, octyl or 1,1,3,3-tetramethylbutyl.

Suitable fused rings are those with 5–7 C atoms, for example cyclopentane, cyclopentene, cyclohexane, cyclohexene or benzene rings.

Suitable halogen atoms $Z_1$, $Z_2$ and $Z_3$ are fluorine, chlorine and bromine atoms.

Dyestuffs in which $n$ denotes 0 are of particular interest.

Preferred deystuffs of the formula I are those in which
$X_1$ denotes amino,
$X_2$ denotes hydroxyl or amino,
$Z_3$ denotes hydrogen,
$n$ denotes 1 and
$R_1$, $R_2$, $R_3$, $Z_1$ and $Z_2$ have the above-mentioned meaning.

Particularly preferred dyestuffs are those which in the form of the free acid correspond to the formula

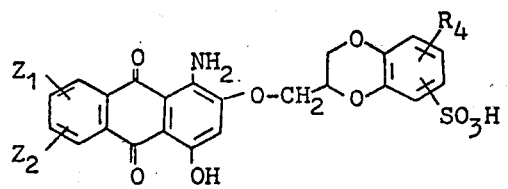

wherein
$R_4$ represents hydrogen, $C_1$–$C_8$-alkyl groups or halogen atoms, such as fluorine, chlorine or bromine and
$Z_1$ and $Z_2$ have the above-mentioned meaning.

The dyestuffs of the formula I are obtained by reacting anthraquinones of the formula

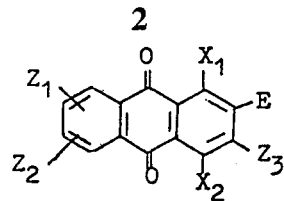

wherein
E represents a replaceable substituent and
$Z_1$, $Z_2$, $Z_3$, $X_1$ and $X_2$ have the above-mentioned meaning with an alcohol of the formula

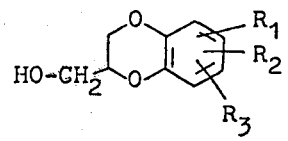

wherein
$R_1$, $R_2$ and R3 have the above-mentioned meaning in the presence of basic compounds and optionally in the presence of an organic solvent, at elevated temperatures, and, if appropriate, sulphonating the products of the formula

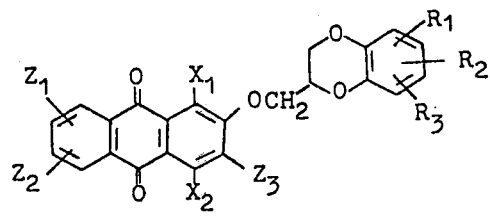

wherein
$Z_1$, $Z_2$, $Z_3$, $X_1$, $X_2$, $R_1$, $R_2$ and $R_3$ have the above-mentioned meaning,
with a sulphonating agent to give the dyestuffs of the formula I, this reaction being carried out either in an excess of the sulphonating agent or in an inert organic solvent.

To prepare anthraquinone dyestuffs of the formula I with $X_1 = X_2 = NH_2$, it is advisable to react anthraquinones of the formula

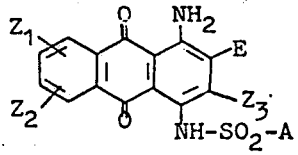

wherein
A represents a phenyl radical which is optionally substituted by $C_1$–$C_4$-alkyl groups or halogen and
$Z_1$, $Z_2$, $Z_3$ and E have the above-mentioned meaning with an alcohol of the formula IV in the presence of basic compounds and optionally in the presence of an organic solvent, at elevated temperature, and to treat the dyestuffs thus obtained, of the formula

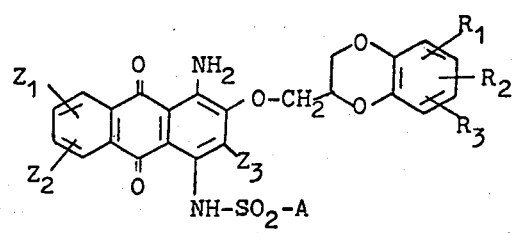

wherein

A has the above-mentioned meaning and $Z_1$, $Z_2$, $Z_3$, $R_1$, $R_2$ and $R_3$ have the above-mentioned meaning with an excess of a sulphonating agent, whereby the radical $A-SO_2-$ is split off and at the same sulphonation occurs to give the dyestuffs of the formula I with $X_1 = X_2 = NH_2$.

The reaction of III with IV or of VI with IV can be carried out without solvents or in the presence of an organic solvent which is inert under the reaction conditions, the reactant IV being employed in at least equivalent amount. The solvent can also be an excess of the component IV.

Examples of suitable organic solvents are: dimethylformamide, dimethylacetamide, dimethylsulphoxide, pyrrolidone-(2), N-methylpyrrolidone-(2), ε-caprolactam, tetramethylurea, hexamethylphosphoric acid triamide and pyridine.

The reaction temperatures can be varied over a substantial range. In general, the reaction is carried out at 80° to 180°C, preferably at 120° to 160°C.

Suitable basic compounds are inorganic bases, for example oxides or hydroxides of alkali metals or alkaline earth metals, such as sodium hydroxide, potassium hydroxide or calcium oxide, alkali metal salts of weak acids, such as sodium carbonate, potassium carbonate, sodium acetate or potassium acetate, or organic bases, for example trimethylamine, triethylamine or benzyltrimethylammonium hydroxide.

Possible replaceable substituents are in particular: halogen, such as chlorine and bromine, lower alkoxy groups, especially the methoxy group, optionally substituted aryloxy groups, preferably phenoxy groups, or the sulphonic acid group.

Examples of suitable anthraquinone compounds III are: 1-amino-2-phenoxy-4-hydroxy-anthraquinone, 1-amino-2-(4-chlorophenoxy)-4-hydroxy-anthraquinone, 1-amino-2-methoxy-4-hydroxy-anthraquinone, 1-amino-2-chloro-4-hydroxy-anthraquinone, 1-amino-2-bromo-4-hydroxy-anthraquinone, 1-amino-4-hydroxy-anthraquinone-2-sulphonic acid, 5-chloro-, 6-chloro-, 7-chloro, 8-chloro-, 6,7-dichloro-, 6-fluoro-, 7-fluoro- and 6,7-difluoro-1-amino-2-phenoxy-4-hydroxy-anthraquinone, 1,4-diamino-2-phenoxy-anthraquinone, 1,4-dihydroxy-2-phenoxy-anthraquinone, 1,4-diamino-2-phenoxy-3-chloro-anthraquinone, 1,4-diamino-2-(2-chlorophenoxy)-3-bromo-anthraquinone, 1,4-dihydroxy-2-phenoxy-bromo-anthraquinone, 1,4-diamino-2,3-dichloro-anthraquinone and 1,4-diamino-2,5-dichloro-anthraquinone.

Examples of suitable anthraquinone compounds VII are: 1-amino-2-chloro-4-tosylamino-anthraquinone, 1-amino-2-bromo-4-tosylamino-anthraquinone, 1-amino-2-phenoxy-4-benzenesulphonylamino-anthraquinone, 1-amino-2-phenoxy-4-tosylamino-anthraquinone, 1-amino-2-phenoxy-4[(4-tert.-butyl-benzene-sulphonyl)-amino]-anthraquinone, 1-amino-2-phenoxy-4-tosylamino-6-chloro-anthraquinone and 1-amino-2-phenoxy-4-tosylamino-7-fluoro-anthraquinone.

The compounds of the formula IV are in part known or can be prepared according to known processes (compare, for example, "Methoden per organischen Chemie" ("Methods of Organic Chemistry") by Houben-Weyl, volume VI/4, page 281 et seq., which also quotes further literature). The preparation of the substituted compound normally gives mixtures of positional isomers which are used as such for the preparation of the dyestuff.

Examples of suitable compounds of the formula IV are:

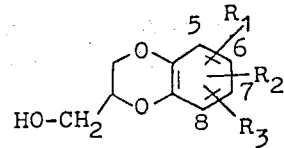

| $R_1$ | $R_2$ | $R_3$ |
|---|---|---|
| H | H | H |
| 5-CH₃ | H | H |
| 6-CH₃ | H | H |
| 7-CH₃ | H | H |
| 8-CH₃ | H | H |
| 5-C₂H₅ | H | H |
| 6-C₂H₅ | H | H |
| 5-CH₂—CH₂—CH₃ | H | H |
| 6-CH(CH₃)₂ | H | H |
| 5-(CH₂)₃CH₃ | H | H |
| 6-CH(CH₃)CH₂—CH₃ | H | H |
| 7-C(CH₃)₃ | H | H |
| 6-(CH₂)₅—CH₃ | H | H |
| 5-(CH₂)₇—CH₃ | H | H |
| 5-CH₃ | 8-CH₃ | H |
| 6-CH₃ | 7-CH₃ | H |
| 6-CH(CH₃)₂ | 7-CH(CH₃)₂ | H |
| 5-(CH₂)₃CH₃ | 8-(CH₂)₃—CH₃ | H |
| 5-CH₃ | 6-CH₃ | 8-CH₃ |
| 5-CH₂—⟨⟩ | H | H |
| 6-CH₂—⟨⟩ | H | H |
| 5-OCH₃ | H | H |
| 6-OCH₃ | H | H |
| 7-OCH₃ | H | H |
| 8-OCH₃ | H | H |
| 5-OC₂H₅ | H | H |
| 6-OC₂H₅ | H | H |
| 6-O—CH₂—CH₂—CH₃ | H | H |
| 5-O—CH(CH₃)₂ | H | H |
| 7-O—(CH₂)₃—CH₃ | H | H |
| 6-O—C(CH₃)₃ | H | H |
| 6-OCH₃ | 7-OCH₃ | H |
| 6-O—(CH₂)₃—CH₃ | 7-O—(CH₂)₃—CH₃ | H |
| 6-O—CH₂—⟨⟩ | H | H |
| 5-S—CH₃ | H | H |
| 7-S—C₂H₅ | H | H |
| 5-SO₂—CH₃ | H | H |
| 7-SO₂—CH₃ | H | H |
| 6-SO₂—CH(CH₃)₂ | H | H |
| 7-SO₂—(CH₂)₃—CH₃ | H | H |
| 5-SO₂—CH₂—⟨⟩ | H | H |
| 5-F | H | H |
| 6-F | H | H |
| 6-F | 7-F | H |
| 5-Cl | H | H |
| 8-Cl | H | H |
| 6-Cl | 7-Cl | H |
| 6-Cl | 8-Cl | H |
| 5-Cl | 6-Cl | 8-Cl |
| 5-Br | H | H |
| 6-Br | 7-Br | H |
| 6-CH₃ | 7-OCH₃ | H |
| 6-CH₃ | 7-O—CH(CH₃)₂ | H |
| 6-Cl | 7-CH₃ | H |
| 6-CH=O | H | H |
| 5-CN | H | H |
| 6-CO—CH₃ | H | H |
| 7-CO—CH₃ | H | H |
| 6-CO—CH₂—CH₃ | H | H |
| 7-CO—CH(CH₃)₂ | H | H |
| 7-CO—⟨⟩ | H | H |

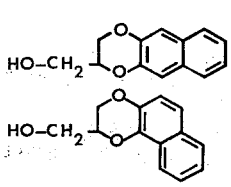

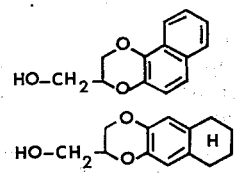

-continued

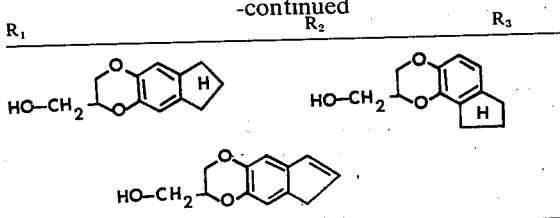

The sulphonation of the intermediate products V or VII is carried out according to processes which are known in principle, using various sulphonating agents, such as sulphuric acid of various concentrations, oleum or various concentrations or chlorosulphonic acid, at temperatures between −20° and +50°C.

The reaction is carried out in an excess of the sulphonating agent or in an inert organic solvent. Examples of inert solvents are chlorinated hydrocarbons such as methylene chloride, chloroform, carbon tetrachloride and ethylene chloride.

The new dyestuffs of the formula I can be isolated in the form of the free acid or as alkali or ammonium salts. Examples of suitable alkali metal salts are the lithium, sodium, or potassium salts. Examples of suitable ammonium salts are those derived from ammonia or monoalkylamines, dialkylamines and trialkylamines, wherein the alkyl radical can possess between 1 and 20 carbon atoms. Equally, the tetraalkylammonium ion is a suitable cation, and in this case the alkyl groups can contain 1–20 carbon atoms.

The dyestuffs of the formula I can be used, optionally also in the form of mixtures, for dyeing and printing natural and synthetic fibre materials. Dyestuffs free of sulphonic acid groups can be employed for dyeing hydrophobic fibres such as polyester fibres and cellulose acetate fibres. Dyeing processes which can be used are in particular the exhaustion process from aqueous solution at the boil, optionally in the presence of customary carriers, or without carriers at 120°–145°C under pressure, and the thermosol process. In addition, the dyestuffs are also suitable for dyeing mixed fabrics of polyester fibres and cellulose fibres with addition of dyestuffs which are suitable for dyeing the cellulose constituent, such as vat dyestuffs or reactive dyestuffs, for the spin dyeing and bulk dyeing of polyamides, polyesters and polyolefins by processes which are in themselves known (compare German Offenlegungsschrift (German Published Specification) No. 2,037,123) and for the dyeing of polyesters and polyamides by the exhaustion process and by the continuous dyeing process from organic solvents in a manner which is in itself known (compare German Offenlegungsschrift (German Published Specification) No. 2,034,264).

Dyestuffs of the formula I which contain sulphonic acid groups ($n = 1$) are in particular suitable for dyeing and printing natural and synthetic fibre materials containing amide groups, for example fibre materials of wool, silk and polyamides. A list of polyamides which can be dyed with the dyestuffs according to the invention is to be found, for example, in H. J. Stein (Textilveredelung 7 (1972) 9).

The brilliant red, violet or orange-yellow dyeings obtained, especially those on polyamide materials, are distinguished by good fastness properties.

The fibre materials can be in the most diverse states of processing, for example in the form of filaments, flocks, or slivers, of piece goods, such as woven fabrics or knitted fabrics, or of made-up goods.

Dyeing or printing can be effected according to processes which are in themselves known, from water or from organic solvents. It is possible to use either the pure dyestuffs or the mixtures of two or more dyestuffs.

EXAMPLE 1 a. 78 g of finely ground potassium carbonate and 249 g of 1-amino-2-phenoxy-4-hydroxy-anthraquinone are introduced into a melt of 1,056 g of 2-hydroxymethyl-1,4-benzodioxane and 678 g of ε-caprolactam at 100°C. The mixture is stirred at 140°C until no further starting material is detectable by chromatography (approx. 2 hours). The reaction mixture is then diluted with 1.5 l of ethanol. After cooling to room temperature, filtration and washing with methanol and water 259 g, corresponding to 85% of theory, of bluish-tinged red crystals are obtained.

b. Dyeing example 100 g of polyethylene terephthalate fibres in 4 l of water are dyed with 1 g of the dyestuff prepared according to the above example, which has first been brought to a finely divided state in the presence of dispersing agents, the dyeing being carried out in the presence of 15 g of o-cresotic acid methyl ester as the carrier for 2 hours at 100°C and pH 4.5. A brilliant yellow-tinged pink dyeing is obtained, which is distinguished by good built-up and high fastness to washing, thermofixing, rubbing and light. A similar colouration is obtained if polyester fibres from 1,4-bis-(hydroxymethyl)-cyclohexane and therephthalic acid are used.

c. 100 g of the dyestuff obtained according to the above instruction are introduced into 1 l of concentrated sulphuric acid at a temperature of at most −5°C, whilst stirring. The solution is stirred at this temperature until starting material is no longer detectable in a sample of the reaction mixture by paper chromatography. The solution is then poured out onto 2.5 kg of ice and 0.5 l of water and the resulting suspension is adjusted to pH 8 with 40% strength sodium hydroxide solution. This causes the temperature to rise to approx. 90°C. The mixture is allowed to cool whilst stirring and the product is filtered off at 60°C and washed with 1% strength sodium chloride solution. The crystals are dried over potassium hyroxide in a drying cabinet. 154.4 g of a powder which — because of its content of inorganic salts — contains approx. 77% of the dyestuff of the formula

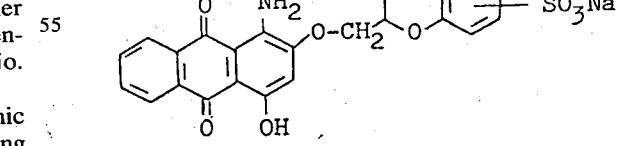

are obtained.

Instead of instruction (c), the following procedure can also be employed:

d. 20 g of the dyestuff obtained according to the above instruction (Example 1a) are suspended in 0.5 of methylene chloride and 10 ccs of chlorosulphonic acid are added dropwise at maximally 20°C. The previously red suspension turns yellow. The mixture is stirred for approx. 30 minutes longer, until the chromatogram of a worked-up sample shows that the starting material has been completely converted, and the yellow compound is then filtered off and washed with approx. 0.5 l of dry methylene chloride. After drying, 31.2 g of a compound which can be converted into the dyestuff of the above formula by means of sodium hydroxide solution are obtained.

The yellow compound described above acquires excellent solubility in water if mixed or ground with salts of strong bases and weak acids, for example with trisodium phosphate, disodium hydrogen phosphate, sodium tetraborate, sodium metaphosphate, sodium carbonate, lithium carbonate and the like.

e. Dyeing example 0.1 g of the dyestuff obtained according to (1b) or (1c) is dissolved in 100 ml of hot water, 5 ml of 10% strength ammonium acetate solution are added and the mixture is diluted to a volume of 500 ml with water. 10 g of polyamide fibres are introduced into the dyebath which is brought to the boil over the course of 20 minutes, 4 ml of 10% strength acetic acid are added and the mixture is kept at the boil for 1 hour. The fibres are then rinsed and dried at 70°–80°C.

EXAMPLE 2 a. 144 g of a mixture of 2-hydroxymethyl-5-methyl- and 2-hydroxymethyl-8-methyl-1,4-benzodioxane, such as is obtained on reacting 2,3-dihydroxy-toluene with epichlorohydrin, are heated with 90.4 g of ε-caprolactam to give a clear melt. 10.4 g of finely ground potassium carbonate and 33.1 g of 1-amino-2-phenoxy-4-hydroxy-anthraquinone are introduced at 100°C and the mixture is heated at 140°C until the starting material has been converted completely (approx. 3 hours). The reaction mixture is then diluted with 200 ml of methanol and cooled. The crystals are filtered off, washed with methanol and water, and dried. 36.7 g (88% of theory) of yellow-tinged red crystals are obtained.

The dyestuff is also obtained in good yield if instead of potassium carbonate the following are used as condensation agents: sodium hydroxide or potassium hydroxide, sodium carbonate, sodium acetate or potassium acetate, calcium oxide or an organic base such as triethylamine, trimethylamine or benzyl-trimethylammonium hydroxide.

b. If in Example (2a), 58.4 g of N,N-dimethylformamide or 69.6 g of N,N-dimethylacetamide are used instead of ε-caprolactam, lactam, the dyestuff is obtained in approximately the same reaction time and in comparably good yield and purity. The dyestuff is also obtained in godd yield if instead of the abovementioned solvents the following are used: pyrrolidone-(2) (68 g), N-methylpyrrolidone-(2) (79.2 g), sulpholane (96 g), dimethylsulphoxide (62.4 g), tetramethylurea (92.8 g) or pyridine.

c. The same dyestuff is obtained in comparably good yield and purity if instead of 1-amino-2-phenoxy-4-hydroxy-anthraquinone 26.9 g of 1-amino-2-methoxy-4-hydroxy-anthraquinone, 36.6 g of 1-amino-2-(4-chlorophenoxy)-4-hydroxy-anthraquinone, 27.4 g of 1-amino-2-chloro-4-hydroxy-anthraquinone, 31.8 g of 1-amino-2-bromo-4-hydroxy-anthraquinone or 34.1 g of the Na salt of 1-amino-4-hydroxy-anthraquinone-2-sulphonic acid are used.

d. 50 g of a mixture of 2-hydroxymethyl-5-methyl- and 2-hydroxymethyl-8-methyl-1,4-benzodioxane, such as is obtained on reacting 2,3-dihydroxy-toluene with epichlorohydrin, are fused by heating and 2.6 g of potassium carbonate and 8.3 g of 1-amino-2-phenoxy-4-hydroxy-anthraquinone are added. The mixture is heated to 160°C, whilst stirring, until no further starting material is detectable (thin layer chromatography). It is then diluted with 50 ml of methanol at 60°C, after cooling the crystals are filtered off and washed with methanol and water, and after drying 9.5 g, corresponding to 91% of theory, of red crystals are obtained.

e. 50 g of a mixture of 2-hydroxymethyl-5-methyl- and 2-hydroxymethyl-8-methyl-1,4-benzodioxane, such as is obtained on reaction of 2,3-dihydroxy-toluene with epichlorohydrin, and 2.1 g of potassium hydroxide are subjected to incipient distillation in vacuo. 8.3 g of 1-amino-2-phenoxy-4-hydroxy-anthraquinone are added and the mixture is heated to 160°C until the starting material has disappeared completely. After working up as described under Example (2d), 8.9 g, corresponding to 85% of theory, of red crystals are obtained.

f. The dyestuff obtained according to Example (2a–e) can be sulphonated in accordance with the following instruction:

10 g of the dyestuff which was obtained according to (2a–e) are introduced over the course of 60 minutes into 150 ml of 90% strength sulphuric acid at 0°C. After a further 15 to 30 minutes at 0°–4°C, complete monosulphonation has taken place. The reaction mixture is diluted by dropwise addition of 600 ml of water at maximally 10°C and the product is then filtered off and washed until almost neutral. After drying, 13.4 g of a product which contains approx. 89% of the dyestuff of the structure

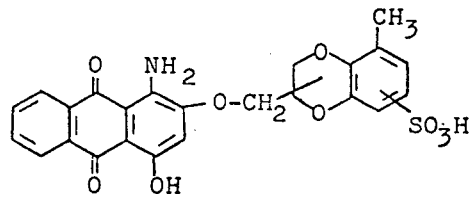

are obtained.

The dyestuff powder can be used for dyeing, either directly or after mixing with salts of strong bases and weak acids as described under Example (1c).

Dyeing example g. 100 g of polyamide 6 fibre material are dyed in a dyebath of 4,000 ml of water, 1 ml of acetic acid (60% by volume) and 1 g of the dyestuff from Example (2f). The bath is heated to the boil over the course of 30 minutes and dyeing is continued for 60 minutes at the boil. The material is then rinsed with cold water and dried, and a brilliant red dyeing of very good fastness to wet processing, dry fixing and light is obtained.

Similar dyeings are obtained on other synthetic and natural polyamides, such as polyamide 66, polyamide 610, polyamide 11, wool or silk.

h. 30 g of the dyestuff obtained according to Example (2f) are dissolved in hot water. 80 g of thiodiethylene glycol and 50 g of urea are added and the solution is stirred into 500 g of crystal gum thickener. A solution of 15 g of ammonium sulphate in water is then added and the mixture is made up to 1 l with water. A fabric of polyamide 66 is printed with this printing mix in the usual manner by the roller printing or screen printing process and is dried and fixed for 30 minutes in a star steamer at 110°C. After the usual finishing by soaping and rinsing, a clear red print with very good fastness to light, wet processing and thermofixing is obtained.

Similar prints are obtained on other synthetic or natural polyamides, such as polyamide 6, polyamide 610, polyamide 11, wool or silk.

i. A dyebath is prepared from 1 g of the dyestuff obtained according to Example (2f), 10 g of sodium sulphate, 2 ml of acetic acid (60% by volume) and 4 l of water. 100 g of wool are introduced into this dyebath at 40°C, the bath is heated to 100°C in 30 minutes and the wool is dyed for 60 minutes at 100°C. After rinsing and drying, a clear, somewhat bluish-tinged red dyeing with very good wet fastness properties and very good fastness to light is obtained.

EXAMPLES 3–72

The anthraquinone compounds listed in Table 1 and 2, which dye synthetic or natural polyamides in yellowish-tinged to bluish-tinged pink shades, are prepared analogously to the description in the preceding examples.

Table 1

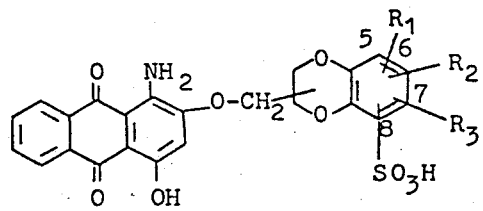

| Example No. | $R_1$ | $R_2$ | $R_3$ |
|---|---|---|---|
| 3 | 6-$CH_3$ | H | H |
| 4 | 6-$CF_3$ | H | H |
| 5 | 5-$C_2H_5$ | H | H |
| 6 | 6-$C_2H_5$ | H | H |
| 7 | 5-$CH_2$—$CH_2$—$CH_3$ | H | H |
| 8 | 6-$CH_2$—$CH_2$—$CH_3$ | H | H |
| 9 | 5-$CH(CH_3)_2$ | H | H |
| 10 | 6-$CH(CH_3)_2$ | H | H |
| 11 | 5-$(CH_2)_3$—$CH_3$ | H | H |
| 12 | 6-$CH(CH_3)$—$CH_2$—$CH_3$ | H | H |
| 13 | 6-$C(CH_3)_3$ | H | H |
| 14 | 6-$(CH_2)_5$—$CH_3$ | H | H |
| 15 | 5-$(CH_2)_7$—$CH_3$ | H | H |
| 16 | 6-$(CH_2)_7$—$CH_3$ | H | H |
| 17 | 5-$CH_3$ | 6-$CH_3$ | H |
| 18 | 5-$CH_3$ | 7-$CH_3$ | H |
| 19 | 5-$CH_3$ | 8-$CH_3$ | H |
| 20 | 6-$CH_3$ | 7-$CH_3$ | H |
| 21 | 6-$CH(CH_3)_2$ | 7-$CH(CH_3)_2$ | H |
| 22 | 6-$(CH_2)_3$—$CH_3$ | 7-$(CH_2)_3$—$CH_3$ | H |
| 23 | 6-$CH_2$—C$_6$H$_5$ | H | H |
| 24 | 5-$CH_3$ | 6-$CH_3$ | 8-$CH_3$ |
| 25 | 5-$OCH_3$ | H | H |
| 26 | 6-$OCH_3$ | H | H |
| 27 | 5-$OC_2H_5$ | H | H |
| 28 | 6-O—$CH_2$—$CH_2$—$CH_3$ | H | H |
| 29 | 6-O—$CH(CH_3)_2$ | H | H |
| 30 | 5-O—$(CH_2)_3$—$CH_3$ | H | H |
| 31 | 6-O—$C(CH_3)_3$ | H | H |
| 32 | 6-O—$CH_2$—C$_6$H$_5$ | H | H |
| 33 | 6-$OCH_3$ | 7-$OCH_3$ | H |
| 34 | 5-$OCH_3$ | 7-$OCH_3$ | H |
| 35 | 6-O—$(CH_2)_3$—$CH_3$ | 7-O—$(CH_2)_3$—$CH_3$ | H |
| 36 | 5-$SCH_3$ | H | H |
| 37 | 6-$SCH_3$ | H | H |
| 38 | 5-$SC_2H_5$ | H | H |
| 39 | 6-S—$(CH_2)_3$—$CH_3$ | H | H |
| 40 | 5-$SO_2$—$CH_3$ | H | H |
| 41 | 6-$SO_2$—$CH_3$ | H | H |
| 42 | 5-$SO_2$-$CH_2$-C$_6$H$_5$ | H | H |
| 43 | 6-$SO_2$—$CH(CH_3)_2$ | H | H |
| 44 | 5-F | H | H |
| 45 | 6-F | H | H |
| 46 | 6-F | 7-F | H |
| 47 | 5-Cl | H | H |
| 48 | 6-Cl | H | H |
| 49 | 5-Cl | 6-Cl | H |
| 50 | 5-Cl | 8-Cl | H |
| 51 | 6-Cl | 7-Cl | H |
| 52 | 5-Cl | 6-Cl | 8-Cl |
| 53 | 5-Br | H | H |
| 54 | 6-Br | H | H |
| 55 | 6-Br | 7-Br | H |
| 56 | 6-$CH_3$ | 7-$OCH_3$ | H |
| 57 | 6-$CH_3$ | 7-O—$CH(CH_3)_2$ | H |
| 58 | 6-Cl | 7-$CH_3$ | H |
| 59 | 6-CH=O | H | H |
| 60 | 5-CN | H | H |
| 61 | 6-CN | H | H |
| 62 | 6-CO—$CH_3$ | H | H |
| 63 | 6-CO—$C_2H_5$ | H | H |
| 64 | 6-CO—$C(CH_3)_3$ | H | H |
| 65 | 6-CO—$(CH_2)_2$—$CH_3$ | H | H |
| 66 | 6-CO—C$_6$H$_5$ | H | H |
| 67 | 5-CO—C$_6$H$_5$ | H | H |

Table 2

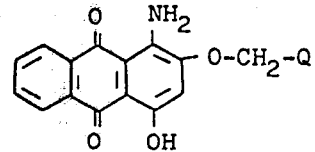

| Example No. | Q |
|---|---|
| 68 | 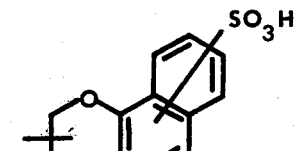 |
| 69 | 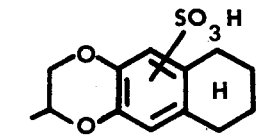 |
| 70 | |

| Example No. | Q |
|---|---|
| 71 | 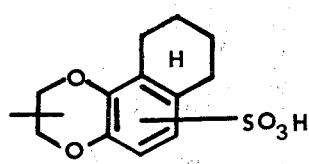 |
| 72 | 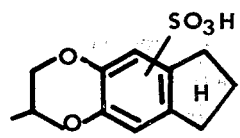 |

EXAMPLE 73 a. 10.4 g of potassium carbonate and 36.6 g of 1-amino-2-phenoxy-4-hydroxy-6-chloro-anthraquinone are introduced into a melt of 177.6 g of a mixture of 2-hydroxymethyl-6-tert.-butyl- and 2-hydroxymethyl-7-tert.-butyl-1,4-benzodioxane, such as is obtained on reaction of 3,4-dihydroxy-1-tert.-butyl-benzene with epichlorohydrin, and 90.4 g of ε-caprolactam at 100°C and the whole is heated to 140°C until the starting material has been converted (approx. 3 to 4 hours). The mixture is worked up as described in Example (2a) and 44 g, corresponding to 89% of theory, of red crystals are obtained.

b. 3.0 g of the dyestuff from Example (73a) are introduced into 50 ccs of 100% strength sulphuric acid at 0°C. The mixture is stirred at this temperature until no further starting material is detectable by thin layer chromatography in a sample which has been worked up. The mixture is then poured out onto 500 g of ice and the dyestuff is filtered off, washed with water until the filtrate issues weakly acid, and dried. 2.8 g, corresponding to 80% of theory, of the dyestuff of the formula

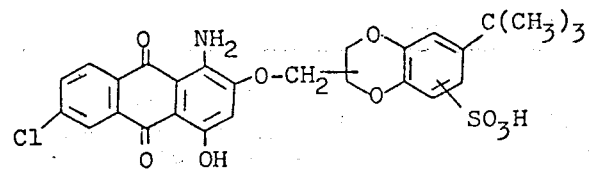

are obtained. The dyestuff obtained gives clear red dyeings or prints with good fastness properties on synthetic or natural polyamide materials if Examples 1 and 2 are followed.

EXAMPLES 74–85

The anthraquinone compounds listed in Table 3 are prepared analogously to the description in the preceding examples and dye synthetic or natural polyamides in yellowish-tinged to bluish-tinged pink shades.

Table 3

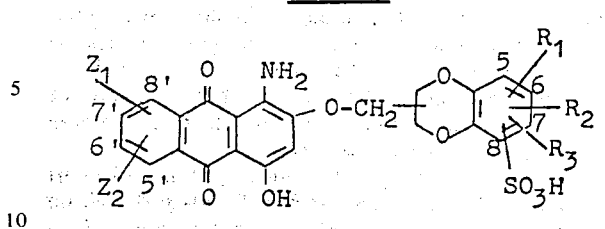

| Example No. | $Z_1$ | $Z_2$ | $R_1$ | $R_2$ | $R_3$ |
|---|---|---|---|---|---|
| 74 | 5'-F | H | H | H | H |
| 75 | 6'-F | H | 5-$CH_3$ | H | H |
| 76 | 7'-F | H | H | H | H |
| 77 | 8'-F | H | 5-$CH_3$ | H | H |
| 78 | 6'-F | 7'-F | H | H | H |
| 79 | 5'-Cl | H | 5-$CH_3$ | H | H |
| 80 | 6'-Cl | H | H | H | H |
| 81 | 6'-Cl | H | 6-$CH_3$ | H | H |
| 82 | 7'-Cl | H | H | H | H |
| 83 | 7'-Cl | H | 6-$CH_3$ | H | H |
| 84 | 8'-Cl | H | 6-$C(CH_3)_3$ | H | H |
| 85 | 6'-Cl | 7'-Cl | H | H | H |

EXAMPLE 86 a. 33.2 g of 2-hydroxymethyl-1,4-benzodioxane and 22.6 g of ε-caprolactam are heated to 100°C and 12.1 g of 1-amino-2-phenoxy-4-tosylamino-anthraquinone and 2.6 g of potassium carbonate are introduced. The mixture is heated to 140°C whilst stirring until, after about 2.5 hours, the starting material has been converted completely. The mixture is then diluted with 50 ml of methanol at 60°C and after cooling the crystals are filtered off, washed with methanol and water and dried, giving 11.3 g, corresponding to 81% of theory, of bluish-tinged red crystals.

b. 5 g of the above dyestuff are introduced into 50 ml of 90% strength sulphuric acid at 0°C and the mixture is stirred at −5° to 0°C until the starting material has been completely converted. The mixture is poured out onto 500 g of ice and the product is filtered off and washed with water until the filtrate issues weakly acid. The moist dyestuff is dissolved in 200 ml of water with addition of sodium hydroxide solution until pH 10 is reached, and is salted out with sodium chloride at 50°C. After standing overnight, the product is filtered off, washed with 10% strength sodium chloride solution until neutral, and dried. 4.1 g of the dyestuff of the formula

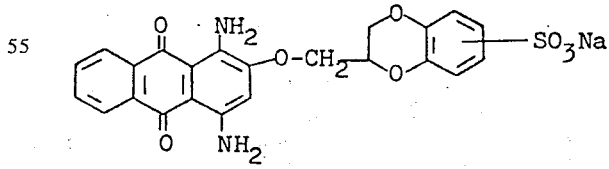

are obtained. The dyestuff obtained gives clear red-violet dyeings or prints with good fastness properties on synthetic or natural polyamide materials, if Examples 1 and 2 are followed.

EXAMPLES 87–97

The anthraquinone compounds listed in Table 4 are prepared analogously to the description in the preceding example and give red-violet dyeings or prints on synthetic or natural polyamide materials.

Table 4

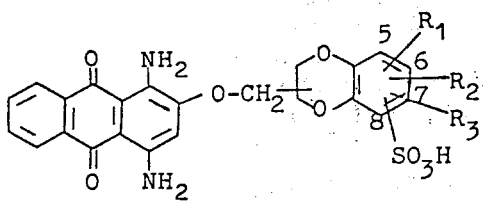

| Example No. | R₁ | R₂ | R₃ |
|---|---|---|---|
| 87 | 5-CH₃ | H | H |
| 88 | 6-CH₃ | H | H |
| 89 | 6-CH(CH₃)₂ | H | H |
| 90 | 6-C(CH₃)₃ | H | H |
| 91 | 6-CH₃ | 7-CH₃ | H |
| 92 | 6-CF₃ | H | H |
| 93 | 6-OCH₃ | H | H |
| 94 | 5-F | H | H |
| 95 | 5-Cl | H | H |
| 96 | 6-Cl | H | H |
| 97 | 6-CO-⌬ | H | H |

EXAMPLE 98 a. A mixture of 33.2 g of 2-hydroxymethyl-1,4-benzodioxane, 22.6 g of ε-caprolactam, 9.2 g of 1,4-dihydroxy-2-(4-chlorophenoxy)-anthraquinone and 2.6 g of potassium carbonate is heated to 140°C until the starting material has been converted completely. The mixture is then diluted with 50 ml of methanol at 60°C and after cooling the product is filtered off, washed with methanol and water and dried. 8.5 g, corresponding to 83% of theory, of orange-yellow crystals are obtained.

b. 5 g of the dyestuff prepared according to Example (98a) are introduced into 50 ml of concentrated sulphuric acid at 0°C and the mixture is stirred at this temperature until conversion is complete. The reaction mixture is poured onto 500 g of ice and the dyestuff which precipitates is filtered off, washed with water until the filtrate issues only weakly acid, and dried. 5.1 g of the dyestuff of the formula

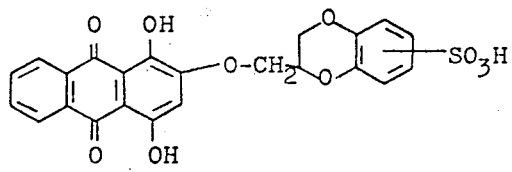

are obtained; this dyestuff gives clear orange-yellow dyeings or prints with good fastness properties on synthetic or natural polyamide materials if Examples 1 and 2 are followed.

EXAMPLE 99–112

The anthraquinone compounds listed in Table 5 are prepared analogously to the description in the preceding example and give dyeings or prints of the indicated colour shade on synthetic or natural polyamide materials.

Table 5

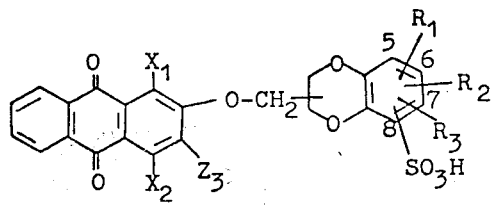

| Example No. | X₁ | X₂ | Z₃ | R₁ | R₂ | R₃ | Colour shade |
|---|---|---|---|---|---|---|---|
| 99 | OH | OH | H | 5-CH₃ | H | H | orange |
| 100 | OH | OH | H | 6-CH₃ | H | H | orange |
| 101 | OH | OH | H | 5-CH(CH₃)₂ | H | H | orange |
| 102 | OH | OH | H | 6–CH₂–⌬ | H | H | orange |
| 103 | OH | OH | H | 6-C(CH₃)₃ | H | H | orange |
| 104 | NH₂ | NH₂ | Cl | H | H | H | violet |
| 105 | NH₂ | NH₂ | Cl | 5-CH₃ | H | H | violet |
| 106 | NH₂ | NH₂ | Cl | 6-CH₃ | H | H | violet |
| 107 | NH₂ | NH₂ | Cl | 5-Cl | H | H | violet |
| 108 | NH₂ | NH₂ | Br | H | H | H | violet |
| 109 | NH₂ | NH₂ | Br | 5-CH₃ | H | H | violet |
| 110 | OH | NH₂ | H | H | H | H | red |
| 111 | OH | NH₂ | H | 5-CH₃ | H | H | red |
| 112 | OH | NH₂ | H | 6-Cl | H | H | red |

We claim:

1. Anthraquinone dyestuffs, which in the form of the free acid correspond to the formula

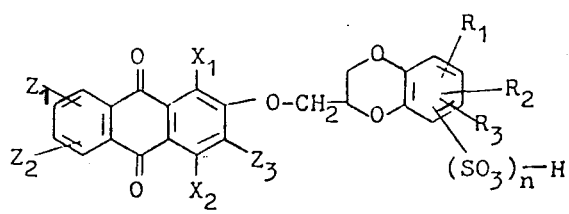

wherein $X_1$ and $X_2$ are hydroxyl or amino, $R_1$, $R_2$ and $R_3$ are hydrogen, $C_1$–$C_8$-alkyl, $C_1$–$C_4$-alkoxy, $C_1$–$C_4$-alkylmercapto, $C_1$–$C_4$-alkylsulfonyl, $C_1$–$C_4$-alkylcarbonyl, formyl, benzoyl, nitrile, halogen, benzyl, benzyloxy or benzylsulfonyl; or two adjacent $R_1$, $R_2$ or $R_3$ radicals taken together form a fused cyclopentane, cyclopentene, cyclohexane, cyclohexene or benzene ring;

$Z_1$, $Z_2$ and $Z_3$ are hydrogen or halogen; and $n$ is 0 or 1.

2. Anthraquinone dyestuffs according to claim 1, in which $R_1$, $R_2$ and $R_3$ are hydrogen, $C_1$—$C_8$-alkyl, $C_1$–$C_4$-alkoxy, $C_1$–$C_4$-alkylmercapto, $C_1$–$C_4$-alkylsulphonyl, $C_1$–$C_4$-alkylcarbonyl, formyl, benzoyl, nitrile, halogen, benzyl, benzyloxy or benzylsulphonyl.

3. Anthraquinone dyestuffs according to claim 2, in which
$n$ is 0.

4. Anthraquinone dyestuffs according to claim 2, wherein
$X_1$ is amino,
$X_2$ is hydroxyl or amino,
$Z_3$ is hydrogen and
$n$ is 1.

5. Anthraquinone dyestuffs which in the form of the free acid correspond to the formula

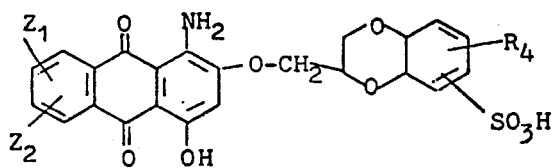

wherein
$Z_1$ and $Z_2$ have the meaning indicated in claim 1 and
$R_4$ is hydrogen, $C_1$–$C_8$-alkyl or halogen 6. Anthraquinone dyestuff, which in the form of the free acid corresponds to the formula

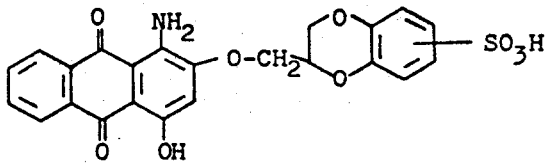

7. Anthraquinone dyestuff, which in the form of the free acid corresponds to the formula

* * * * *